Dec. 13, 1955     W. N. KILNER ET AL     2,727,161
CONSTRUCTION OF DYNAMO ELECTRIC MACHINES
Filed Dec. 9, 1952     4 Sheets-Sheet 1

Inventors
William Norman Kilner
Harold Sylvester Wood
By Bateman
Attorneys

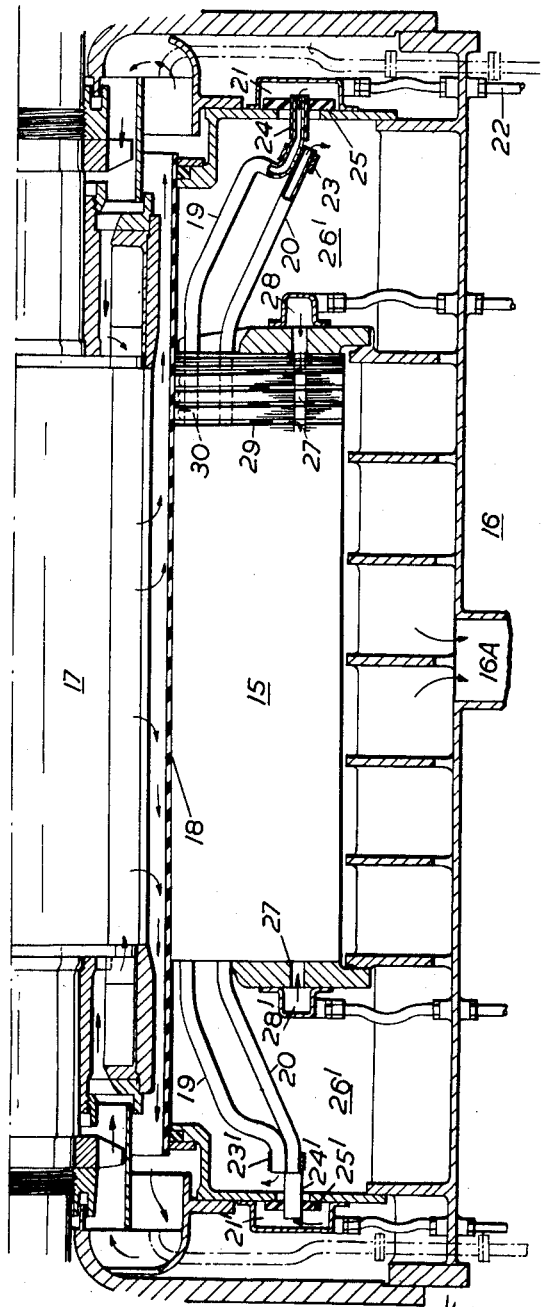

Dec. 13, 1955  W. N. KILNER ET AL  2,727,161
CONSTRUCTION OF DYNAMO ELECTRIC MACHINES
Filed Dec. 9, 1952  4 Sheets-Sheet 3
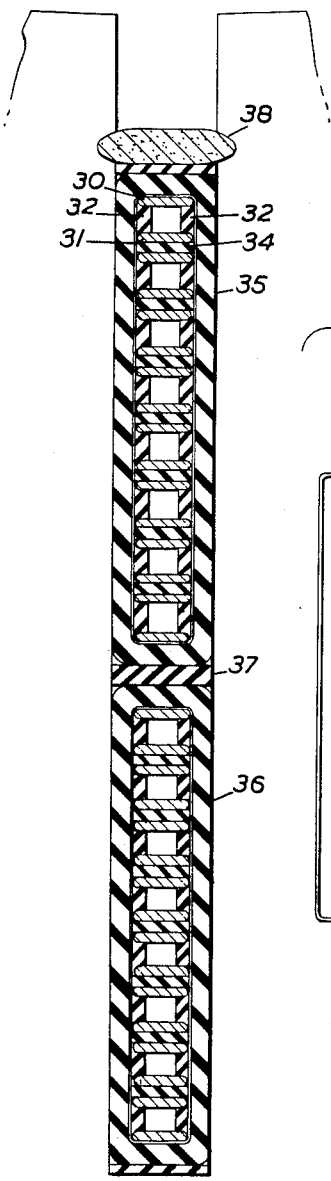
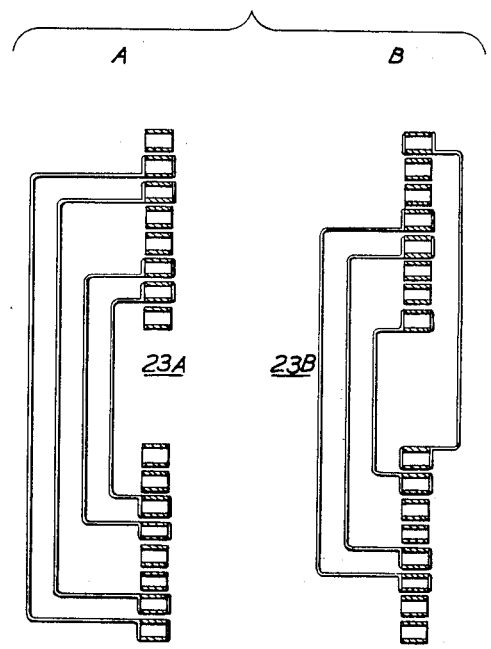
Inventors
William Norman Kilner
Harald Schieter Wood
By
Morris & Bateman
Attorneys

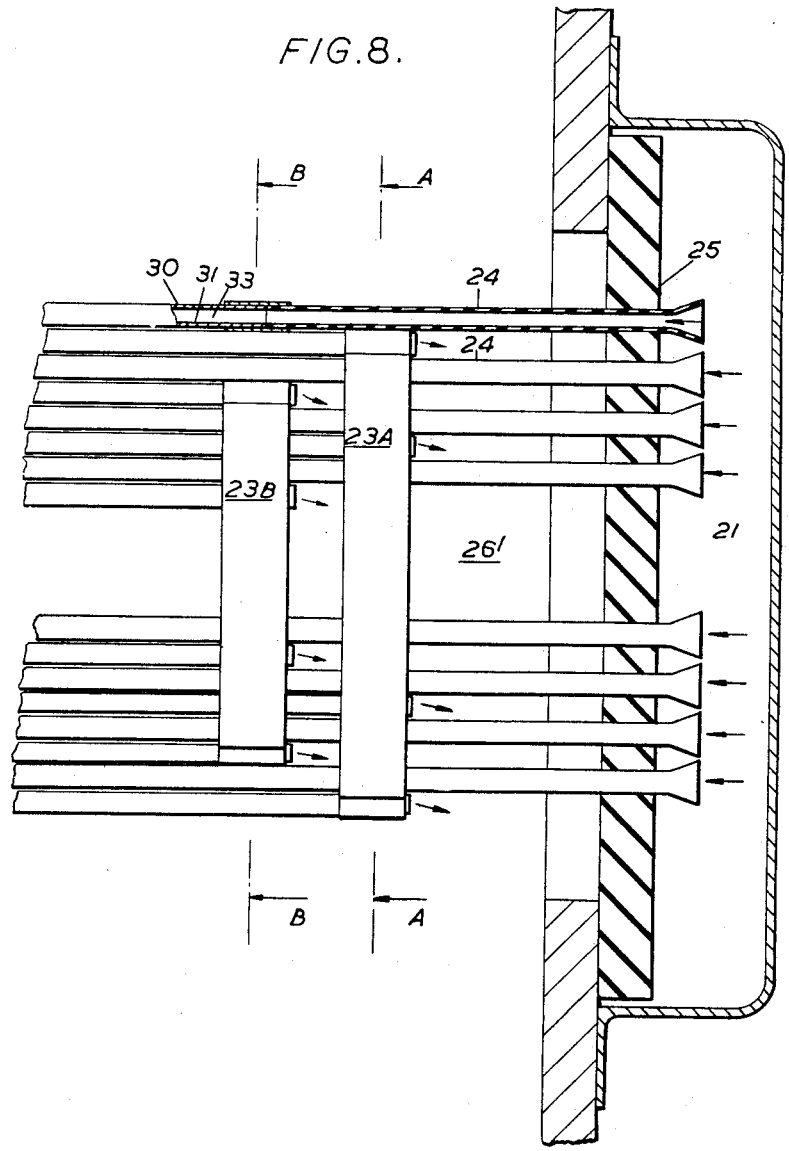

United States Patent Office 2,727,161
Patented Dec. 13, 1955

2,727,161

CONSTRUCTION OF DYNAMO ELECTRIC MACHINES

William Norman Kilner, Hale, and Harald Isbister Wood, Crewe, England, assignors to Metropolitan-Vickers Electrical Company Limited, London, England, a British company Application December 9, 1952, Serial No. 324,936

Claims priority, application Great Britain December 12, 1951

4 Claims. (Cl. 310—64)

This invention relates to dynamoelectric machines and has an important application in large size turbo-alterntors.

The maximum output of such machines is limited by several factors, among the most important of which is the permissible temperature use which in turn depends upon the rate of dissipation of heat generated in the machines.

The customary method of cooling such machines is by forced circulation of gas, usually air or hydrogen, through the machine. Such a method of cooling is effective to remove heat from the core surfaces and the exposed end sections of the winding, but embedded sections of the windings rely upon thermal conduction to exposed surfaces to dissipate heat.

The main object of the invention is to improve the cooling of the stator winding.

According to the present invention the stator conductors of a dynamoelectric machine are formed with longitudinal passages, and means are provided for passing fluid through said passages to effect cooling.

The conductors may comprise metal strips held apart by insulating spacers, themselves spaced apart laterally so as to provide cooling passages.

The term fluid as used herein includes a gas such as air or hydrogen, and also includes an easily vapourisable liquid such as Freon or carbon tetrachloride.

In order that the invention may be more clearly understood reference will now be made to the accompanying drawings in which—

Fig. 5 is a longitudinal section of a machine in which the stator is adapted for liquid cooling;

Fig. 6 shows, on an enlarged scale, a development of the arrangement shown in Fig. 2 which may be employed with the machine construction of Fig. 5, whilst Figs. 7 and 8 are detail views showing how the conductor ends would be joined when employing windings as shown in Fig. 6;

Fig. 8 is a view taken on the same section plane as Fig. 5, but to an enlarged scale, whilst in Fig. 7 the assemblies A and B are sectional views taken on the lines A—A and B—B of Fig. 8.

Figure 1:
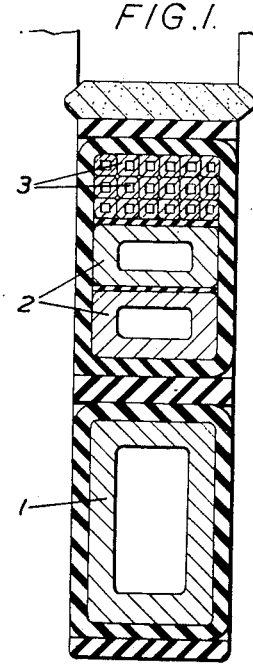
Figs. 1 to 4 are sectional views of stator slots showing examples of different forms of conductors.

Since the need for transposing conductors at the bottom of the slot is less than it is towards the top of the slot in the arrangement of Fig. 1, the "bottom bar" (shown underneath in the figure) is formed by a single square-section hollow conductor 1, while the "top bar" (shown uppermost in the drawing) comprises two square-section hollow conductors 2 of intermediate size and a number of square-section hollow conductors 3 of small size, cooling gases being arranged to flow through the passages formed by the interiors of all these conductors, which are insulated and arranged in the slot in conventional manner.

An arrangement of this kind enables the cooling gases to be brought directly into contact with the actual conductors and therefore provides for very efficient cooling.

Figure 2:
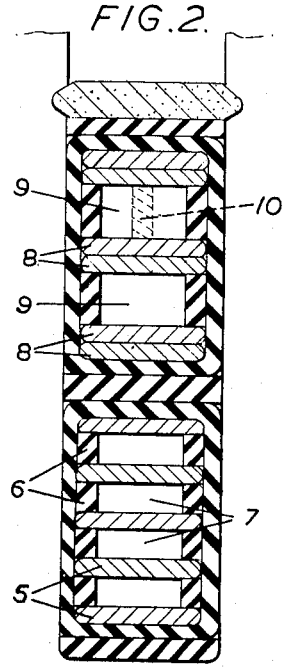

Fig. 2 shows another arrangement in which the conductors in the bottom bar consist of rectangular metal straps 5 which are spaced from one another by insulating spacers 6 to form passages 7 through which the gases may flow, while the top bar consists of three pairs of straps 8 which are similarly spaced to form the passages 9. It may in some cases be desirable for mechanical reasons to provide in addition a central spacer 10, as shown by the dotted lines, between the two upper pairs of straps of the top bar.

In the arrangement the individual straps forming each pair 8 or adjacent straps 5 may be transposed along the length of the slot in conventional manner, while transposition between the various pairs could be effected by suitable connections at the ends of the conductors.

Figure 3:
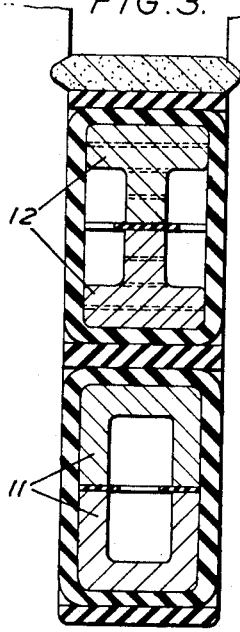
Figure 4:
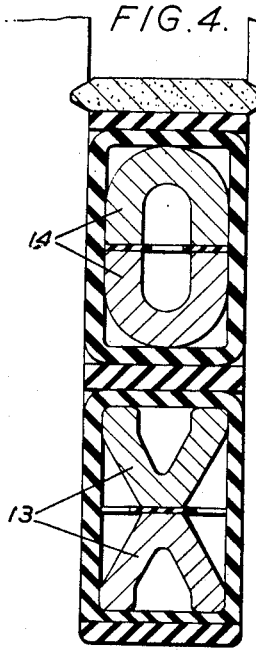

Figs. 3 and 4 show further alternative forms of conductor that may be used in order to provide suitable passageways through the slot for the flow of the cooling gases.

Fig. 3 shows an arrangement in which two U-shaped conductors 11, forming the bottom bar, are placed together to form an internal cooling passage whilst two T-shaped conductors 12 forming the top bar, are arranged as shown to provide cooling passages between the centre rib and the insulation lining the sides of the slots.

Fig. 4 shows two V-shaped conductors 13 forming the bottom bar and two U-shaped conductors 14 forming the top bar. In the bottom bar there are four parallel passages between the conductor and insulator, whilst in the top bar there is one central passage. If in order to reduce eddy currents further subdivision of the bars is required, it is contemplated that each individual conductor could be sub-divided, as indicated in dotted lines for the top bar in Fig. 3, to provide a plurality of separate conductors which are insulated from one another and can be transposed by suitable cross connections at the ends of the conductors.

Fig. 5 shows how such conductors could be arranged in a turbo-alternator. In the figure the reference 15 indicates the stator core and 16 the underneath part of the surrounding frame, whilst 17 is a part of the rotor. A cylindrical sheet 18 of non-metallic material extends along the annular gap between the rotor periphery and the stator. In the arrangement shown in Fig. 5 the top and bottom bars are shown as consisting each of a single conductor of rectangular section, these are of the same type as the bottom bar 1 in Fig. 1, and are indicated by the references 19 and 20 respectively. Liquid is fed into the right hand end of the conductor 19 from an inlet chamber 21 extending around the stator core and fed through a pipe 22. The ends of the conductors 19 and 20 are electrically interconnected by a metal connector 23 whilst the passage through the upper conductor 19 connects with the chamber 21 by means of an insulating sleeve 24 which is fitted into an aperture in an insulating plate 25. The liquid from the chamber 21 flows to the left through the passage in the conductor 19 and discharges into the chamber 26 at the left end of the stator. Similarly, at the left end of the machine the two conductors are electrically interconnected by a connector 23' whilst in this case the lower conductor 20 is coupled with the supply chamber 21' by means of an insulating sleeve 24' fitted into the insulating plate 25'. Thus, whilst the fluid flow through the upper conductor 19 is from right to left, the flow through the lower conductor 20 is from left to right as viewed in Fig. 5 the lower conductor discharging into the chamber 26'.

In the arrangement shown additional liquid cooling for the core is provided by means of axial ducts 27 fed at the ends from supply chambers 28, 28'. The axial ducts 27 feed liquid into the radial core ducts 29. In the arrangement each alternate core duct 29 is fed from the ducts 27 and these in turn feed the intervening core ducts through passages 30 along the inner face of the core, the direction of flow being indicated by the arrows and the vapour finally discharging through the outlet 16A at the bottom of the casing. With this arrangement the rotor would be gas cooled, for instance, hydrogen cooled, and it is for this reason that the wall 18 is provided i. e. so as to separate the liquid cooling system of the stator from the gas cooling system of the rotor.

In cases in which the stator is gas cooled the wall 18 can be dispensed with and the gas which is passed through the hollow conductors into the spaces 26 and 26' would then mix with the discharged gas from the rotor cooling system and be cooled by passing through a cooler before being recirculated.

Fig. 6 shows an arrangement in which the conductors are formed of parallel straps similarly to the bottom bar (shown uppermost) in Fig. 2. In this case, however, there are eight pairs of straps in the top bar and also in the bottom bar; the top and bottom straps 30 and 31 of each pair are separated by insulating spacers 32. The spacers 32 are themselves spaced laterally so that a cooling passage 33 is formed between each pair of conductor strips 30 and 31 and the associated pair of insulating spacers 32. Each group so formed is separated from the adjacent group by an insulating strip 34. Whilst the assembly forming the upper bar is enclosed in insulation 35 and the lower bar is enclosed in insulation 36 the two bars are separated by a spacer 37, and a wedge 38 retains both bars in the slot.

Fig. 8 shows the arrangement at the ends of such a winding. In this arrangement half the conductor passages are fed from the inlet fluid space 21 at one end of the winding, the passages discharging at the opposite end of the machine. The remaining conductor passages will be fed from the opposite end of the machine and discharge into the space 26'. The couplings are effected by square-section insulating tubing 24 which joins each group of straps to an insulating plate 25, the tubes 24 projecting through the plate 25 into the space 21. A similar construction would be provided at the opposite end of the machine, but here it would be the alternate strap groups which would be coupled.

Figs. 7A and 7B respectively show how the connectors 23A and 23B of Fig. 8 could be arranged to effect transposition of the conductor groups. Transposition between the top and bottom conductors of each pair could, of course, be carried out in the slot.

It will be understood that means will be provided for causing the cooling fluid to circulate. In the case of a liquid this will comprise a pump, whilst with gas cooling an additional fan can be provided on the rotor shaft, gas leaving the delivery side of the fan being suitably guided to the ends of the conductors.

It will also be appreciated that with hydrogen it will normally be necessary to provide some form of cooler for cooling the hydrogen before recirculation. This need arises mainly because with hydrogen very careful sealing of the machine is necessary.

In the case of liquid cooling the liquid can, of course, be led out of the machine and then returned after cooling.

What we claim is:

1. A dynamoelectric machine comprising a rotor and a stator, a winding to said stator arranged in slots, the winding in each slot comprising a plurality of conductors group into a top and a bottom bar respectively, walling to each of said conductors defining at least one longitudinal passage to each of said conductors, an annular fluid inlet chamber at one end of the machine communicating with a set of conductor passages in each slot, discharge means for said passages at the opposite end of the machine, an annular fluid inlet chamber at said opposite end of the machine communicating with another set of conductor passages in each slot, discharge means at said first mentioned end of the machine, means for passing cooling fluid through said conductor passages from the inlet chambers at both ends of the machine respectively for flow in relatively opposite directions through the sets of conductor passages, conductor straps at the ends of the machine connecting individual conductors projecting from the ends of each slot respectively with selected individual conductors in each slot, and means for mechanically supporting said conductor ends.

2. A dynamoelectric machine comprising a rotor and a stator, a winding to said stator arranged in slots, the winding in each slot comprising a plurality of conductors stacked in a top and a bottom bar respectively, walling to each of said conductors defining a longitudinal passage to each of said conductors, an annular fluid inlet chamber at one end of the machine communicating with alternate conductor passages in each slot, discharge means for said passages at the opposite end of the machine, an annular fluid inlet chamber at said opposite end of the machine communicating with the intervening conductor passages in each slot, discharge means at said first mentioned end of the machine, means for passing cooling fluid through said conductor passages from the inlet chambers at both ends of the machine respectively for flow in relatively opposite directions through the sets of conductor passages, conductor straps at the ends of the machine connecting individual conductors projecting from the ends of each slot respectively with selected individual conductors in a related slot, and means for mechanically supporting said conductor ends.

3. A dynamoelectric machine comprising a rotor and a stator, a winding to said stator arranged in slots, the winding in each slot comprising a plurality of conductors stacked in a top and a bottom bar respectively, walling to each of said conductors defining a longitudinal passage to each of said conductors, an annular fluid inlet chamber at one end of the machine communicating with a set of alternate conductor passages in each slot, discharge means for said passages at the opposite end of the machine, an annular fluid inlet chamber at said opposite end of the machine communicating with the intervening conductor passages in each slot, discharge means therefor at said first mentioned end of the machine, means for passing cooling fluid through said conductor passages from the inlet chambers at both ends of the machine respectively for flow in relatively opposite directions through the sets of conductor passages, insulating walling to said inlet chambers through which walling the projecting ends of said conductors pass so as to be mechanically supported thereby, and conductor straps located between the ends of the machine and said insulating walls and electrically connecting individual conductors projecting from the ends of each slot respectively with selected individual conductors in a related slot.

4. A dynamoelectric machine comprising a rotor and a stator, a winding to said stator arranged in slots, the winding in each slot comprising a plurality of conductors stacked in a top and a bottom bar respectively, said conductors each comprising a pair of spaced parallel straps, spaced insulating distance pieces interposed between said pairs of straps, the straps and distance pieces defining longitudinal passages, an annular fluid inlet chamber at one end of the machine communicating with a set of alternate conductor passages in the slot, discharge means for said passages at the opposite end of the machine communicating with the intervening conductor passages in each slot, discharge means therefor at said first mentioned end of the machine, means for passing cooling fluid through said conductor passages from the inlet chamber at both ends of the machine respectively for flow in relatively opposite directions through the sets of conductor passages, insulating walling to said inlet chambers through which walling the projecting ends of said conductors pass so as to be mechanically supported thereby, and conductor straps located between the ends of the machine and said insulating walls and connecting individual conductors projecting from the ends of each slot respectively with selected individual conductors in the related slot.

References Cited in the file of this patent

UNITED STATES PATENTS

| | | |
|---|---|---|
| 1,170,192 | Rudenberg | Feb. 1, 1916 |
| 1,291,459 | Field | Jan. 14, 1919 |
| 1,390,064 | Taylor | Sept. 6, 1921 |
| 1,448,700 | Seidner | Mar. 13, 1923 |
| 2,573,670 | Moses | Oct. 30, 1951 |
| 2,605,312 | Boyer | July 29, 1952 |

FOREIGN PATENTS

| | | |
|---|---|---|
| 82,417 | Austria | Jan. 25, 1921 |
| 169,459 | Switzerland | Aug. 1, 1934 |